United States Patent [19]
Hentschel

[11] 3,824,430
[45] July 16, 1974

[54] CIRCUIT ARRANGEMENT FOR RECOGNITION OF A DEFECT CAUSED BY PHASE BREAKDOWN OR GROUND SHORT IN THE CURRENT SUPPLY OF A THREE-PHASE MOTOR

[75] Inventor: Michael Hentschel, Hannover, Germany

[73] Assignee: Sprecher & Schuh AG, Aarau, Switzerland

[22] Filed: May 16, 1973

[21] Appl. No.: 360,946

[30] Foreign Application Priority Data
Aug. 23, 1972 Switzerland.................... 12483/72

[52] U.S. Cl. ............................ 317/13 R, 317/33 R
[51] Int. Cl. .............................................. H02h 7/09
[58] Field of Search ..................... 317/13 R, 33 R

[56] References Cited
UNITED STATES PATENTS
| | | | |
|---|---|---|---|
| 3,600,657 | 8/1971 | Pfaff et al. | 317/13 R |
| 3,602,771 | 8/1971 | Walstad et al. | 317/13 R |

*Primary Examiner*—L. T. Hix
*Attorney, Agent, or Firm*—Eric H. Waters

[57] ABSTRACT

A circuit arrangement for recognition of a defect from detection alternating voltages proportional to current values at the outer conductors of a three-phase motor and which defects are brought about by phase breakout or ground short in the current supply of the three-phase motor, wherein there are provided a time division-multiplex device and thereafter a rectifier circuit arrangement for generating a time division-multiplex signal from the detection alternating voltages by means of cyclically successive samples of uniform duration and forming from the positive or negative parts of the time division-multiplex signal through smoothing a measurement voltage, the amplitude of which is approximately equal to the arithmetic mean value of the rectified multiplex signal. There is further provided a differentiator for differentiating the time division-multiplex signal for the recognition of a phase breakdown, a first comparator for comparing the voltage pulse of the differentiator possessing the maximum amplitude value with a percentual part of the measurement voltage, and wherein the percentual part of the measurement voltage is selected such that the phase breakdown comparator with undisturbed current supply of the motor does not respond and upon the occurrence of a phase breakdown delivers a phase breakdown-indicating signal. For the recognition of a ground short from the time division-multiplex signal there is provided a low pass filter arrangement for deriving peak values of signal components occurring with the frequency of the detection alternating voltages, and a second comparator for comparing the peak values with another percentual part of the measurement voltage, wherein this another percentual part is chosen such that the ground short-comparator during undisturbed current supply of the motor does not respond and upon occurrence of a ground short delivers a ground short-indicating signal.

9 Claims, 4 Drawing Figures

CIRCUIT ARRANGEMENT FOR RECOGNITION OF A DEFECT CAUSED BY PHASE BREAKDOWN OR GROUND SHORT IN THE CURRENT SUPPLY OF A THREE-PHASE MOTOR

BACKGROUND OF THE INVENTION

The present invention relates to a new and improved circuit arrangement for the recognition of a defect from detection alternating voltages proportional to the current values at the outer or external conductors of a three-phase motor and which defect is brought about by phase breakdown or ground short in the current supply of the three-phase motor.

To protect three-phase motors against harmful overheating of their windings there have been employed, for instance, electronic motor protection relays in which a control signal characteristic of the heating of the motor is produced, by means of an electric motor simulation, from a measurement voltage which is dependent upon the current values in the motor outer conductors, and by means of this control signal, upon reaching a boundary temperature, the relay is energized so as to switch-off the current supply for the motor. Notwithstanding the use of such motor protection relays impermissible heating of the motor windings can occur upon the presence of a ground short or a break in a conductor or winding. The breakdown or dropout of a phase leads to an increase in the current in both of the non-affected outer conductors (two-phase operation). If the motor is Y-connected, i.e., connected in a star circuit configuration, then during phase breakdown the current increase in the non-affected outer conductors corresponds to the current increase in the associated windings, yet the total losses increase much more markedly so that the relay will switch-off too late. In the case of a motor connected in a delta-circuit configuration and in the case of phase breakdown the current intensity in two windings remains approximately unchanged whereas the current in the third winding increases. The percentual current increase in this third winding is generally however greater than the percentual current increase in both of the non-affected conductors, so that overheating of this third winding can occur if the relay does not carry out its cut-off function early enough.

The motor is particularly susceptible to damage if a ground short occurs at a winding. The increase in current upon the occurrence of a winding ground short is however dependent upon the location of the ground short and that much smaller the closer the location of the ground short is to the star point for a motor which is wound in star or wye-configuration and in the case of a delta-circuit connected motor the closer that the ground short is located to the winding center, so that upon the occurrence of a winding ground short the overload can be initially so low that the relay does not switch-off. In a symmetrical three-phase system the peak value of the rectified phase voltages for 3-pulse rectification is twice as great as the lowest momentary value of such voltages. As soon as non-symmetrical conditions arise then this relationship changes. This phenomena is employed in known devices for protecting 3-phase current loads in which there is generated from the phase voltages rectified by means of a three-phase current rectifier a measurement voltage proportional to the peak value and from the measurement voltage and the lowest momentary value of the relationship there is generally formed the difference. If this relationship or difference exceeds a predetermined value, that is to say, if the three-phase current system becomes non-symmetrical, then a signal is generated or the load shut-off. Such devices become very complicated and expensive when, instead of the phase voltages, there are available for the derivation of the measurement voltage the previously mentioned detection alternating voltages in the order of magnitude of 1 volt and less, since then expensive precision rectifiers must be employed.

SUMMARY OF THE INVENTION

It is a primary object of the present invention to provide a circuit arrangement of relatively simple construction and design for the recognition of defects at a three-phase motor and which separately determines the occurrence of a ground short and phase breakdown from detection alternating voltages of 1 volt and less and delivers appropriate indicating signals, so that for generating the detection alternating voltages there can be employed priceworthy current/voltage converters and by means of the separate indicating signals for ground short and phase breakdown the motor protection relay can be controlled for optimum protection of the three-phase motor.

Now in order to implement this object and others which will become more readily apparent as the description proceeds, the inventive circuit arrangement is generally manifested by the features that there are provided a time division-multiplex device and a rectifier circuit connected after the time division-multiplex device in order to generate from the detection alternating voltages, by means of cyclic successive samples of uniform duration, a time division-multiplex signal, the signal amplitude and signal frequency of which is determined by the interlaced or overlapping detection alternating voltages. A measurement voltage is formed from the positive or negative components of the time division-multiplex signal by smoothing and the formation of a mean value. The amplitude of the measurement voltage at approximately the peak value of the maximum detection alternating voltage and the arithmetic mean value is proportional to the three detection alternating voltages.

For the recognition of phase breakdown or dropout the time division-multiplex signal is differentiated by means of a differentiator and the voltage pulse of the differentiator possessing the maximum amplitude value is compared at a first comparator with a percentual part of the measurement voltage. This percentual part or fraction of the measurement voltage is chosen such that the phase breakdown-comparator in the case of indisturbed current supply of the motor does not respond and upon the occurrence of phase breakdown delivers a phase breakdown indicating signal.

For the recognition of a ground short there is derived from the time-multiplex signal, by means of a low pass filter for signal components occurring with the frequency of the detection alternating voltages, the peak value and this peak value is compared at a second comparator with another percentual part of the measurement voltage, and wherein this other percentual part or fraction of the measurement voltage is chosen such that the ground short-comparator, with undisturbed current supply of the motor, does not respond and upon occurrence of a ground short delivers a ground short-indicating signal.

The multiplex signal generated by means of a time division-multiplex device, and the latter of which can be of simple construction, contains the information necessary for recognition of undisturbed current supply of the motor and by virtue of phase breakdown and ground short the information for defect detection of the disturbed current supply of the motor. For separation of the ground short- and phase breakdown information there can be appropriately employed a low-pass filter and a differentiator, each of which can consist of a resistor and a capacitor. By means of the indicating or reporting signals which are obtained at separate channels the electronic motor protection relay can be controlled in such a way that upon the occurrence of a ground short-indicating signal or phase breakdown-indicating signal it is activated practically without delay or in accelerated fashion, so that the protection of the motor is insured for in any case. A further advantage resides in the fact that only one rectifier or rectifier arrangement is necessary. As the rectifier there can be employed a precision rectifier, the output of which is electrically connected with a voltage divider and for smoothing the output voltage coupled with at least one capacitor. The voltage divider is designed such that there can be tapped therefrom the part of the measurement voltage for the ground short- and/or phase breakdown comparator.

For standardizing the time division-multiplex signal there can be connected between the output of the time division-multiplex device and the rectifier circuit an amplifier having an adjustable gain. As such amplifier there can be advantageously employed an operational amplifier, the one input of which is connected with the output of the time division-multiplex device and the other input of which is connected with a voltage divider for adjusting the gain, and wherein the resistance relationship of the voltage divider branch fixed by the tap for the operational amplifier input determines the gain. Also the ground short- and/or phase breakdown comparator circuit can contain as the comparator an operational amplifier, the one input of which is connected with the low-pass filter or the differentiator respectively, at the other input of which there appears the momentary percentual part or fraction of the measurement voltage and the output of which is connected with the control input of an electronic switch, in particular a field-effect transistor which, upon occurrence of a ground short- or phase breakdown-signal at the output of the relevant operational amplifier, responds. These electronic switches for controlling the electronic motor protection relay can be connected without difficulty at the locations of the control circuit which are most suitable for this purpose. A respective resistor of the voltage divider which determines the gain of the amplifier preferably bridges the field-effect transistor of the ground short-comparator circuit and the field-effect transistor of the phase breakdown comparator circuit and the gain of the amplifier, upon occurrence of a ground short and a phase breakdown respectively, can be switched-over to a different value by blocking the corresponding field-effect transistor by the output signal of the operational amplifier of the corresponding comparator circuit. Additionally, there can be connected at the outputs of the operational amplifiers of the ground short- and phase breakdown-comparator circuits a defect indicator circuit having an acoustical or optical signalling device, in order to simultaneously indicate the occurrence of a defect.

BRIEF DESCRIPTION OF THE DRAWINGS

The invention will be better understood and objects other than those set forth above, will become apparent when considerations is given to the following detailed description thereof. Such description makes reference to the annexed drawings wherein.

DETAILED DESCRIPTION OF THE PREFERRED EMBODIMENTS

Figure 1:
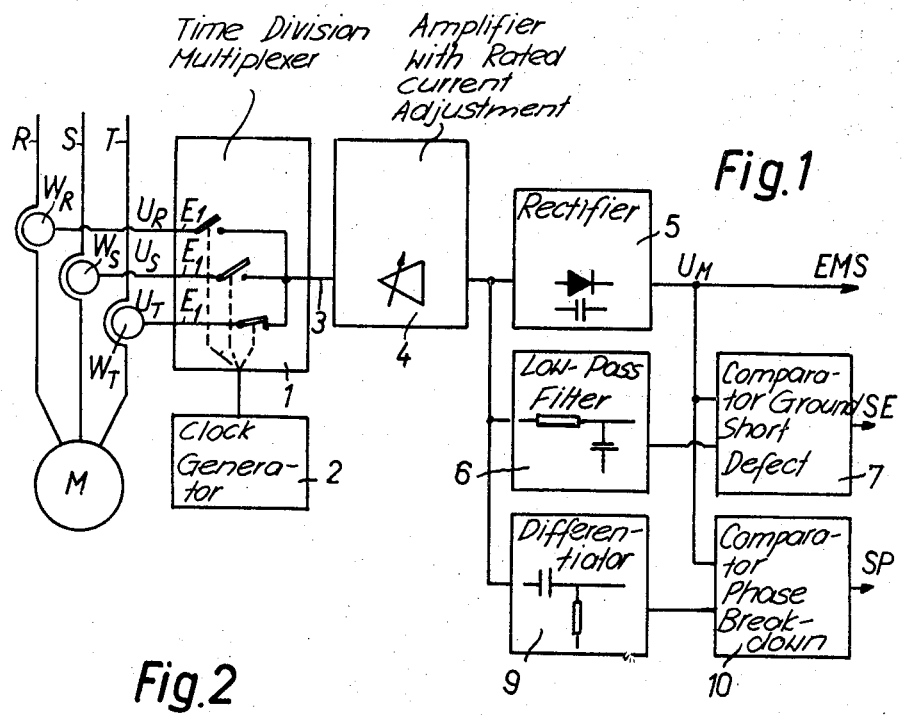
FIG. 1 is a block circuit diagram of a circuit arrangement for signalling ground short- and phase breakdown defects.

As will be apparent by referring to the block circuit diagram of FIG. 1 current/voltage-converters $W_R$, $W_S$, $W_T$ are connected at the outer or external conductors R, S, T of the motor M, and which converters deliver, in the form of input signals for the circuit arrangement, voltages proportional to the motor currents, i.e., the detection alternating-current voltages $U_R$, $U_S$, $U_T$. The current/voltage converters $W_R$, $W_S$ and $W_T$ can be of simple and priceworthy construction since, for the circuit arrangement, detection alternating voltages or alternating-current voltages of only low magnitude, for instance one volt and less, are required. The detection alternating-current voltages $U_R$, $U_S$, $U_T$ are applied to the three inputs $E_1$ of a time division multiplexer 1 controlled by a clock generator 2 and which continuously sequentially connects the three inputs $E_1$, always for a similar time-span, at a collector conductor 3. The clock frequency of the clock generator 2 is considerably greater than the frequency of the motor current (50 Hz) and, for instance, amounts to 2 kHz.

Figure 2:
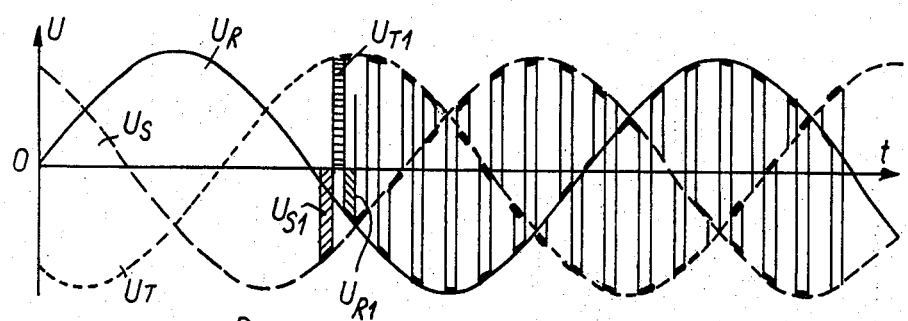
FIG. 2 schematically illustrates an oscillogram for a time-multiplex signal appearing in the circuit arrangement of FIG. 1.

FIG. 2 illustrates an oscillogram for the multiplex signal transmitted by the collector conductor 3. The oscillogram of this time division-multiplex signal possesses successive "signal packages" of the same duration and positive or negative amplitude respectively, by means of which the interlaced or overlapping sample values of the three detection alternating voltages $U_R$, $U_S$, $U_T$ are reproduced. Owing to the cyclically successive sampling of the three detection alternating voltages $U_R$, $U_S$, and $U_T$, in the oscillogram, for undisturbed current supply of the motor and higher clock frequency, that is to say, shorter sampling times (duration of the signal package) the total surface area of three successive signal packages and which are evaluated according to their positive or negative amplitude, is equal to null or zero. In the graph of FIG. 2 there have been designated by reference characters $U_{S1}$, $U_{T1}$, $U_{R1}$ three successive signal packages or increments and such have been also accentuated by shading the same.

For amplifying the time division-multiplex signal there is provided an amplifier 4 which possesses a sufficiently high cut-off frequency to insure for good transmission of the signal flanks and the gain of this amplifier is adjustable for standardizing the output signal for further processing. The output signal of the amplifier 4 is delivered to a rectifier circuit arrangement 5 for for rectification and smoothing and respectively forming a mean or average value, this rectifier circuit arrangement 5 delivering a measuring or measurement voltage $U_M$. The rectifier circuit arrangement 5 firstly contains a precision rectifier by means of which, for instance, the negative signal packages of the amplified multiplex signal are clipped and also contains a capacitor for smoothing and forming the mean value of the output voltage of the rectifier and from which there is tapped-off the measurement voltage $U_M$. The output voltage of the rectifier reproduces, via the multiplex signal, the one envelope of the three detection alternating voltages $U_R$, $U_S$, $U_T$ and with undisturbed current supply of the motor, during symmetrical operation, contains a harmonic oscillation of 150 Hz with a ratio $U_{min}/U_{max}$ of 0.5. The measurement voltage $U_M$ at the capacitor, depending upon the switching or circuitry, is proportional to a mean value of the three detection alternating voltages $U_R$, $U_S$, $U_T$ and the peak value of the maximum detection alternating voltage. The measurement voltage $U_M$ is employed for controlling an electronic motor protection relay EMS and with the circuit arrangement under consideration is required for the recognition of a ground short or phase breakdown or dropout occurring at the motor.

The total surface area of three successive signal packages (FIG. 2), as already previously mentioned, with undisturbed current supply of the motor is equal to null, that is to say with three successive signal packages the total surface area of the positive signal packages is equal to the total surface area of the negative signal packages, however such is not equal to null when a ground short is present. Upon the occurrence of a ground short there will be recognized from the oscillogram of FIG. 2 that there appears a resultant component which appears in the output voltage of the amplifier 4 as a 50 Hz-component. For recognition of the ground short there is provided in the circuit arrangement of FIG. 1 a low-pass filter 6 which is electrically coupled in circuit with the output of the amplifier 4 and designed such that the clock frequency is positively suppressed, whereas the 50 Hz frequency is practically not attenuated. Now at a comparator circuit 7 there is compared the peak value of the 50-Hz component which is present with a ground short at the output voltage of the amplifier 4 with the measurement voltage $U_M$. Since a ground short can be simulated in the event of non-symmetry at the current converters $W_R$, $W_S$, $W_T$ and a certain overloading of the motor without damage is permissible, this peak value is therefore compared with a certain percent or percentual part of the measurement voltage $U_M$ and the comparator circuit 7, if desired, while resorting to the aid of further circuit components, such as for instance a controlled electronic switch, can be designed such that a signal SE which reports a ground short is delivered as soon as the peak value has exceeded this certain percent of the measurement voltage $U_M$.

The dropout of a phase i.e., phase breakdown in the current supply of the motor occurs upon interruption of an outer conductor, for instance due to breakdown of a fuse, or at a winding. In this regard both of the following situations can be distinguished: (a) the motor shifts into a two-phase operation owing to high load and markedly weakened torque or (b) at lower load the motor continues to run with increased slip wherein the winding- and outer conductor currents markedly increase owing to the approximately constant required load. Upon dropout of a phase the vector sum of the outer conductor currents and accordingly in the oscillogram of the time division-multiplex signal (FIG. 2) the total surface area of three successive signal packages remains equal to null.

Figure 3:
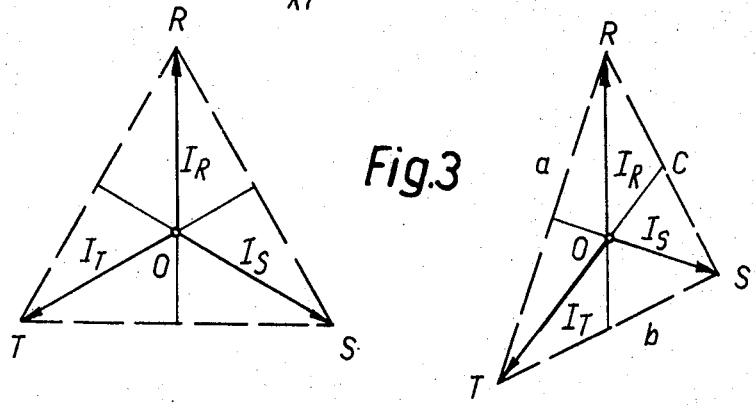
FIG. 3 depicts current diagrams for a three-phase motor during undisturbed current supply and during current supply which is disturbed owing to non-symmetry of the supply voltages.

When the vector sum of three vectors is null in the vector diagram then as is known the origin appears at the center of gravity of the triangle which is laid out between the vectors and each side bisector of the triangle is sub-divided by the origin into a partial ratio of 2:1, so that each side bisector has a length which amounts to 3/2 of the corresponding vector. For vectors of the same length there results an equilateral triangle. The triangle becomes that much more distorted the greater the non-symmetry in the length and phase angles of the vectors. Such a vector diagram also is applicable for a symmetrical and non-symmetrical three-phase voltage, wherein the vector sum of the voltage vectors is equal to null, in other words, also for the present case of a three-phase motor with symmetrical operation and with phase breakdown. For the outer conductor currents $I_R$, $I_S$, $I_T$ there have been depicted in FIG. 3 appropriate current vector diagrams in which the lengths of the side bisectors of the triangle always amount to 3/2 $|I_R|$, 3/2 $|I_S|$, 3/2 $|I_T|$. With undisturbed current supply there results for $|I_R| = |I_S| = I_T|$ an equilateral triangle and with the dropout or breakdown of a phase there occur non-symmetrical conditions in the length of the current vector and the phase angle, so that the triangle then becomes more or less distorted. In the distorted current vector diagram of FIG. 3 the length of the longest side a of the triangle can be represented by the equation $$a = \sqrt{2|I_R|^2 + 2|I_T|^2 - |I_S|^2}.$$

For the longest side a of the triangle there are two extreme values, a smallest value, when $|I_R| = |I_S| = |I_T|$ (equilateral triangle) and a maximum value when $|I_S| = 0$. For the determination of a non-symmetrical condition occurring in the current vector triangle there is formed the quotient from the value of the longest current vector of the sum of the values of the three current vectors and the longest side of the triangle, so that there is obtained a ratio of proportionality factor V which is a measure for the non-symmetry for both techniques. In the case of forming the quotient from the longest current vector and the longest side of the triangle there results the proportionality factor V corresponding to FIG. 3 ($a$ = longest side of the triangle, $I_R$ = longest current vector) and which can be expressed by:

$$V_1 = \frac{|I_R|}{\sqrt{2|I_R|^2 + 2|I_T|^2 - |I_S|^2}}$$

If the side $b$ or $c$ constitutes the longest side of the triangle then the subscripts are appropriately reversed.

As values for such proportionality factor $V_1$ there are obtained:
in the case where
$$|I_R| = |I_S| = |I_T| \ldots V_{11} = 1/\sqrt{3} = 0.577$$

in the case where
$|I_R| = |I_T|, |I_S| = 0 \ldots V_{12} = 1/2 = 0.500$
in the case where
$|I_S| = |I_T|, |I_R| = \sqrt{3}|I_T| \ldots V_{13} = \sqrt{3}/\sqrt{7} = 0.654$ If the quotient is formed from the sum of the current vector values and the longest side of the triangle then there is obtained the ratio of proportionality factor $V_2$ (FIG. 3) which can be expressed as follows:

$$V_2 = \frac{|I_R| + |I_S| + |I_T|}{\sqrt{2|I_R|^2 + 2|I_T|^2 - |I_S|^2}}$$

As values for this proportionality factor $V_2$ there are obtained:
in the case where
$|I_R| = |I_S| = |I_T| \ldots V_{21} = 3/\sqrt{3} = 1.73$
in the case where
$|I_R| = |I_T|, I_S = 0 \ldots V_{22} = 2/2 = 1.00$
in the case where
$|I_S| = |I_T|, |I_R| = \sqrt{3}|I_T| \ldots V_{23} = (2 + \sqrt{3})/\sqrt{7} = 1.41$ As can be seen from the proportionality factors the differences between undisturbed and disturbed operation are greater when the quotient is formed from the arithmetic mean value of the three currents and the longest side of the triangle. Since the formation of an exact arithmetic mean value is complicated if it is carried out by circuits a practical embodiment advantageously is somewhere between both extreme cases. Since also the generation of a voltage signal proportional to the proportionality factor V requires a relatively great expenditure the maximum spike pulse of the differentiator is compared with a percentual proportion or fraction of the measurement voltage.

In the circuit arrangement of FIG. 1 there are applied to the inputs of comparator 10 the spike or needle pulses of the differentiator 9 and the measurement voltage $U_M$ of the rectifier circuit 5. The comparator 10 is adjusted such that with undisturbed current supply of the motor the maximum amplitude of the pulses delivered by the differentiator 9 are somewhat beneath the measurement voltage peak. The comparator 10, upon the occurrence of a phase breakdown, during which then pulses are present with amplitudes which are above the measurement voltage peak, delivers a signal SP which indicates the dropout or breakdown of a phase.

Figure 4:
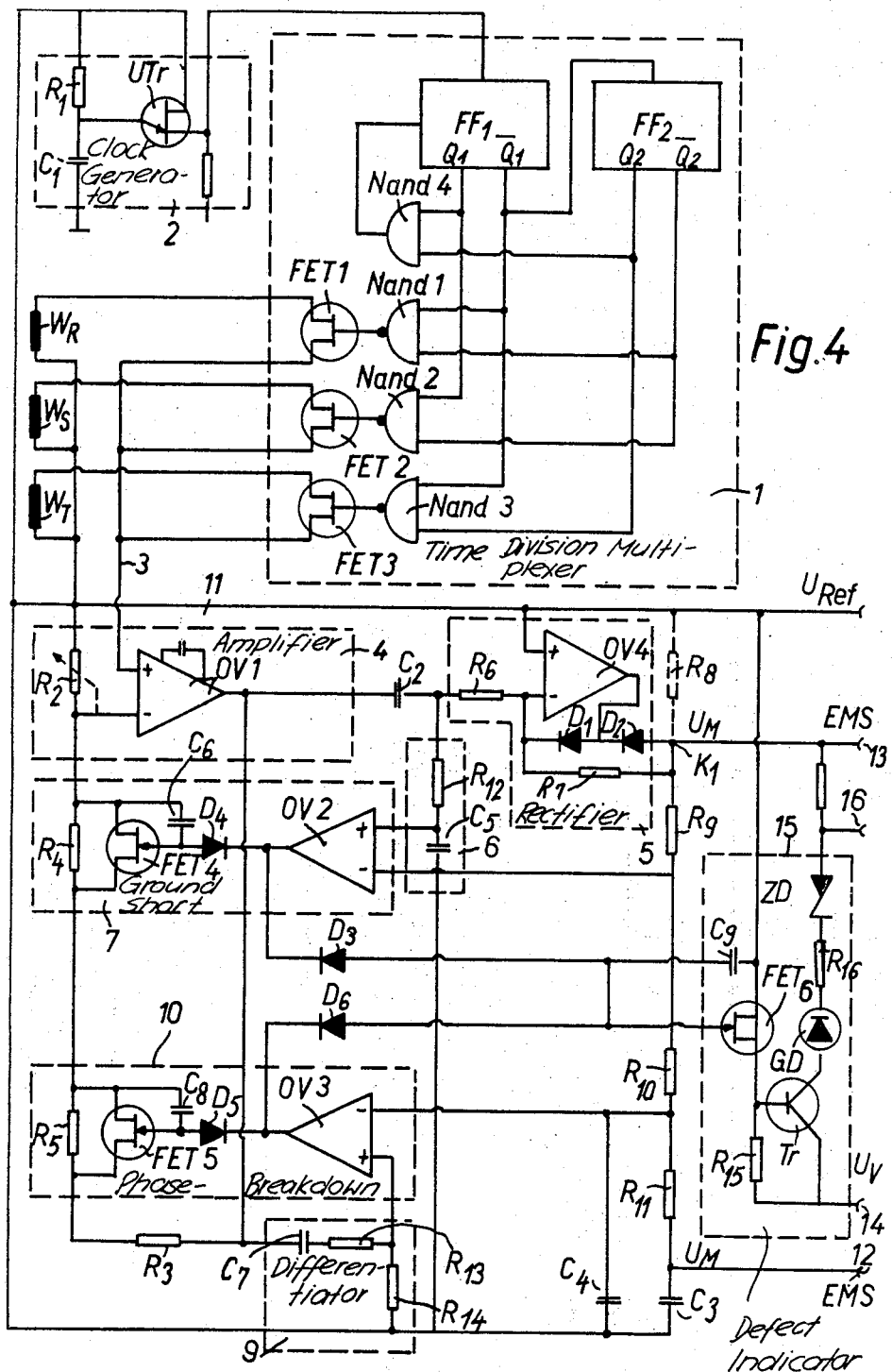
FIG. 4 is a circuit diagram of the circuit arrangement of FIG. 1 depicting details thereof.

FIG. 4 illustrates a detailed circuit diagram of the exemplary embodiment of circuit arrangement depicted in FIG. 1. As the clock generator 2 there is here employed, for instance, an oscillator of conventional construction which is equipped for example with a unijunction transistor UTr, and the RC-element $R_1C_1$ of the oscillator possesses a time-constant for a clock frequency of 2 and 3 kHz. The time multiplexer 1 contains two flip-flops $FF_1$ and $FF_2$ which together with a NAND-gate Nand 4 form a counter which counts in a cyclic sequence up to three. The output of the clock generator 2 is coupled with the clock input of the one flip-flop $FF_1$. At the outputs $Q_1, \overline{Q}_1$ and $Q_2, \overline{Q}_2$ of both flip-flops $FF_1$ and $FF_2$ there are connected three NAND-gates Nand 1, Nand 2, Nand 3 in such a manner that the one gate circuit Nand 1, for instance, for the signal combinations O, O occurring at the outputs $Q_1$ and $Q_2$, the gate circuit Nand 2 for the signal combination L, O, and finally the gate circuit Nand 3 for the signal combination O, L, deliver a control signal. As switch means for connecting the current converters $W_R, W_S, W_T$ with the collector conductor 3 there are employed field-effect transistors FET 1, FET 2 and FET 3 which are controlled so as to be conductive by the control signals of the NAND-gate circuits Nand 1, Nand 2 and Nand 3.

The amplifier circuit 4 contains an operation amplifier OV1, at the non-inverting input of which there is connected the collector conductor 3. The inverting input of the operational amplifier OV 1 is connected with a voltage divider which is coupled between its output and a conductor 11 carrying a stabilized reference voltage $U_{Ref}$. This voltage divider has a preresistor $R_2$ which can be manually adjusted and by means of which it is possible to regulate the gain of the operational amplifier OV1 for accommodating the circuit arrangement to the momentarily prevailing rated current intensity of the motor, and three fixed resistors $R_3, R_4, R_5$, of which the resistors $R_4$ and $R_5$ are capable of being bridged or shunted by circuit paths in order to, as will be more fully explained hereinafter, switch the gain to higher values upon the occurrence or defects in the current supply.

The output of the operational amplifier OV1 is connected by means of a capacitor $C_2$ with a precision rectifier or rectifier arrangement 5 of standard circuit design. By means of the capacitor $C_2$ the output signal of the operational amplifier OV1 is separated from the part of the rectified current which prevails by virtue of the offset voltage of the operational amplifier which is strongly effective during high gain. The precision rectifier or rectifier circuit 5 contains an operational amplifier OV4, the non-inverting input of which is connected with the conductor 11 which conducts the reference voltage $U_{Ref}$, and the inverting input of which is connected by means of a resistor $R_6$ with the capacitor $C_2$ and additionally by means of a diode $D_1$ with which there is connected in parallel a resistor $R_7$ and a diode $D_2$, with the output of the operational amplifier OV4. The output terminal K1 of the rectifier circuit 5 is located at the connection point or junction of the resistor $R_7$ and the diode $D_2$. At the output K1 there is connected via a resistor $R_9$ an RC-circuit containing the resistors $R_{10}, R_{11}$ and the capacitors $C_3, C_4$. This RC-circuit forms a low-pass filter arrangement by means of which the clock frequency is suppressed, and the time-constant of this RC-circuit is preferably chosen to be so high that the waviness of the rectified output voltage of the rectifier circuit arrangement is rather slight, for instance smaller than one percent. In this circuit arrangement there occurs maximum or peak rectification during which the capacitor $C_3$ is always charged to the peak value of the highest signal package in the multiplex signal (FIG. 2). If the output K1 is connected by means of a resistor $R_8$ with the conductor 11, and which resistor is low ohmic in relationship to the resistors $R_9 + R_{10} + R_{11}$, then the measurement signal $U_M$ at the capacitor $C_3$ corresponds approximately to the mean or average value of the three detection currents. The measurement voltage $U_M$ required by the electronic motor protection relay EMS can be high-ohmic and filtered via a connection terminal 12 from the capacitor $C_3$ and removed low-ohmic via connection terminal 13 from the output K1 of the rectifier circuit 5.

The comparator circuit 7 provided for the recognition of a ground short contains an operational amplifier OV2, the output of which is connected via a diode $D_4$ with the gate of a field-effect transistor FET 4. The channel of the field effect transistor FET 4 is bridged by the resistor $R_4$ of the voltage divider $R_2$, $R_3$, $R_4$, $R_5$ connected at the inverting input of the operational amplifier OV1. The non-inverting input of the operational amplifier OV2 is connected to the low-pass filter 6 consisting of the resistor R12 and the capacitor C5 and the inverting input is connected with the voltage divider consisting of the resistors $R_9$, $R_{10}$, $R_{11}$ and which is connected between the output K1 and the capacitor $C_3$. The output voltage of the amplifier circuit 4 is delivered to the low-pass filter 6 via the capacitor $C_2$. If a ground short occurs then there appears at the output signal of the amplifier circuit 4 a 50 Hz-alternating-current voltage, the peak value of which is applied via the low-pass filter 6 at the non-inverting input of the operational amplifier OV2. The response threshold of the operational amplifier OV2 is determined by the amplitude of the part of the measurement voltage $U_M$ which is tapped-off the voltage divider $R_9$, $R_{10}$, $R_{11}$. as soon as the peak value exceeds the response threshold then there appears at the output of the operational amplifier OV2 voltage pulses which, decoupled by the diode $D_4$, block the field-effect transistor FET 4, so that the resistor $R_4$ of the voltage divider connected to the inverting input of the operational amplifier OV1 becomes effective and via the now greater gain of the operational amplifier OV1 owing to the resistance relationship or ratio which has been changed to $R_2$: ($R_3$ + $R_4$) increases the measurement voltage $U_1$ to such an extent that the electronic motor protection relay EMS responds and the current supply of the motor is shut-off.

The circuit arrangement depicted in FIG. 4 for protection against phase breakdown or dropout is particularly simple in construction. It contains an operational amplifier OV3 in the comparator circut 10, the inverting input of which is connected with the voltage divider $R_9$, $R_{10}$, $R_{11}$ which is connected with the output of the rectifier circuit 5 and its non-inverting input is connected via the differentiator 9 consisting of the capacitor $C_7$ and the resistors $R_{13}$ and $R_{14}$ with the output of the operational amplifier OV1. The voltage pulses delivered from the differentiator 9 to the operational amplifier OV3 are compared with the measurement voltage $U_M$ and as soon as the voltage pulses become greater than the measurement voltage appearing at the inverting input of the operational amplifier OV3 there then appears at the output thereof voltage pulses. The relationship or ratio of the resistace values for the differentiator resistor $R_{13}$ and the resistor $R_{14}$ is chosen such that the operational amplifier OV3 does not respond during undisturbed current supply of the motor. The voltage pulses which are applied to the output of the operational amplifier OV3, upon the occurrence of phase breakdown, are decoupled by a diode $D_5$, and delivered to the gate of a field-effect transistor FET5. The resistor $R_5$ of the voltage divider $R_2$, $R_3$, $R_4$, $R_5$ and which voltage divider is connected with the non-inverting input of the operational amplifier OV1, is connected in parallel with the channel of the field-effect transistor FET5, so that by blocking of the field-effect transistor FET5 the gain of the operational amplifier OV1 is increased. The resistor $R_5$ in this case possesses such a value that by connecting it in circuit via the higher gain of the operational amplifier OV1 the measurement voltage is increased by a certain amount.

For signalling ground short and phase breakdown there is provided a defect indicator or alarm circuit 15. In the illustrated exemplary embodiment of circuitry of FIG. 4 there is present at such defect indicator circuit 15 the collector-emitter path of a transistor $T_r$, a gallium-arsenide diode GD, a limiter resistor $R_{16}$ and a reference diode ZD which are connected in series circuit via the connection terminals 14 and 16 with the operating voltage. The transistor $T_r$ is controlled by a field-effect transistor FET6, the gate of which is connected via a diode $D_6$ with the output of the operational amplifier OV3 (phase breakdown), and via a diode $D_3$ with the output of the operational amplifier OV2 (ground short) and further via a capacitor $C_9$ with the conductor 11 carrying the reference voltage. An output signal of the operational amplifier OV2 during ground short, or an output signal of the operational amplifier OV3 during phase breakdown, controls through the agency of the field-effect transistor FET6 the transistor Tr so as to be conductive, so that a light signal is delivered by the gallium-arsenide diode.

While there is shown and described present preferred embodiments of the invention, it is to be distinctly understood that the invention is not limited thereto, but may be otherwise variously embodied and practiced within the scope of the following claims. Accordingly,

What is claimed is:

1. A circuit arrangement for the recognition of a defect from detection alternating voltages proportional to the current values at outer conductors of a three-phase motor and which defects are brought about by phase breakout or ground short, in the current supply of the three-phase motor, the combination comprising a time division-multiplex device and a rectifier circuit arrangement connected in circuit after the time division-multiplex device for generating a time division-multiplex signal from the detection alternating voltages by cyclic successive samples of uniform duration and forming from the positive or negative parts of the time division-multiplex signal through smoothing a measurement voltage, the amplitude of which is approximately equal to the arithmetic mean value of the rectified multiplex signal, a differentiator for differentiating the time division-multiplex signal for the recognition of a phase breakdown, a phase breakdown comparator for comparing the voltage pulse of the differentiator possessing maximum amplitude value with a percentual part of the measurement voltage, wherein the percentual part of the measurement voltage is selected such that the phase breakdown comparator with undisturbed current supply of the motor does not respond and upon the occurrence of a phase breakdown delivers a phase breakdown-indicating signal, and that for the recognition of a ground short from the time division-multiplex signal there is provided a low pass filter arrangement for deriving peak values for signal components occuring with the frequency of the detection alternating voltages, and a ground short comprator for comparing the peak values with another percentual part of the measurement voltage, wherein this another percentual part of the measurement voltage is chosen such that ground short comparator during indisturbed current supply of the motor does not respond and upon occurrence of a ground short delivers a ground short-indicating signal.

2. The circuit arrangement as defined in claim 1, wherein an amplifier having an adjustable gain for standarizing the output signal is connected in circuit between the output of the time division-multiplex device and the rectifier circuit.

3. The circuit arrangement as defined in claim 2, wherein the amplifier comprises an operational amplifier having a first input and a second input, said first input being connected with the output of the time division-multiplex device and its second input being connected with a voltage divider for adjusting the gain of the operational amplifier, and wherein the resistance relationship of the voltage divider branch determined by the tap for the operational amplifier input determines the gain.

4. The circuit arrangement as defined in claim 1, wherein the ground short comparator contains an operational amplifier having a first input, a second input and an output, said first input being connected with the low pass filter and said second input having applied thereto the corresponding percentual part of the measurement voltage, and said output being connected with the control input of an electronic switch which responds upon occurrence of a ground short signal at the output of the ground short comparator.

5. The circuit arrangement as defined in claim 4, wherein the electronic switch comprises a field-effect transistor.

6. The circuit arrangement as defined in claim 1, wherein the phase breakdown comparator contains an operational amplifier having a first input, a second input and an output, said first input being connected with the differentiator, and the second input having applied thereto the corresponding percentual part of the measurement voltage, and said output being connected with the control input of an electronic switch which responds upon occurrence of a phase breakdown signal at the output of the phase breakdown comparator.

7. The circuit arrangement as defined in claim 6, wherein the electronic switch comprises a field-effect transistor.

8. The circuit arrangement as defined in claim 1, wherein the rectifier circuit contains a precision rectifier means having an output connected to a voltage divider and for smoothing the output voltage is coupled with at least one capacitor, and wherein the part of the measurement voltage for the ground short and/or phase breakdown comparator is tapped off this voltage divider.

9. The circuit arrangement as defined in claim 4, wherein the phase breakdown comparator contains an operational amplifier having a first input, a second input and an output, said first input being connected with the differentiator, and the second input having applied thereto the corresponding percentual part of the measurement voltage, and said output being connected with the control input of an electronic switch which responds upon occurrence of a phase breakdown signal at the output oc the phase breakdown comparator, each comparator containing a field-effect transistor constituting the corresponding electronic switch, and wherein a respective resistor of a voltage divider determining the gain of the amplifier is connected with the field-effect transistor of the ground short comparator and with the field-effect transistor of the phase breakdown comparator and bridges each such field effect transistor, and the gain of the amplifier upon occurrence of a ground circuit and a phase breakdown through blocking of the corresponding field-effect transistor by the output signal of the corresponding operational amplifier switches the corresponding comparator to a different value, and at the outputs of the operational amplifiers of the ground short- and phase breakdown-comparators there is connected a defect indicator circuit having a signalling device.

* * * * *